United States Patent
Rahimi

(10) Patent No.: US 6,329,790 B1
(45) Date of Patent: Dec. 11, 2001

(54) BATTERY CHARGER

(76) Inventor: Shayan Rahimi, #307-124 W. 20th Street, North Vancouver, British Columbia (CA)

( * ) Notice: Subject to any disclaimer, the term of this patent is extended or adjusted under 35 U.S.C. 154(b) by 0 days.

(21) Appl. No.: 09/493,051

(22) Filed: Jan. 28, 2000

(51) Int. Cl.$^7$ .................................................. H02J 7/00
(52) U.S. Cl. ................................... 320/125; 320/110
(58) Field of Search .............................. 320/125, 110, 320/129, 130, 142, 149

(56) References Cited

U.S. PATENT DOCUMENTS

| | | | |
|---|---|---|---|
| 4,395,672 | 7/1983 | Gassaway | 320/158 |
| 4,647,834 | 3/1987 | Castleman | 320/141 |
| 5,248,928 * | 9/1993 | Gilmore | 320/142 |
| 5,481,174 * | 1/1996 | Martin et al. | 320/129 |
| 5,523,667 | 6/1996 | Feldstein | 320/118 |
| 5,602,462 * | 2/1997 | Stich et al. | 320/163 |
| 5,670,862 * | 9/1997 | Lewyn | 320/149 |
| 5,686,811 * | 11/1997 | Bushong et al. | 320/110 |

* cited by examiner

Primary Examiner—Peter S. Wong
Assistant Examiner—Lawrence Luk
(74) Attorney, Agent, or Firm—Elbie R. de Kock

(57) ABSTRACT

A timed electric battery charger 10 for the processing of non-lithium, small appliance and utility batteries 19 through a charging cycle comprising a current source having an alternating current input 11 and a direct current output 14 and a timer 16 for dividing the charging cycle into a plurality of successive, predetermined phases, each phase comprising a duty cycle wherein a charging current is delivered to the battery, alternated with a resting cycle during which a charging current is not delivered to the battery.

4 Claims, 1 Drawing Sheet

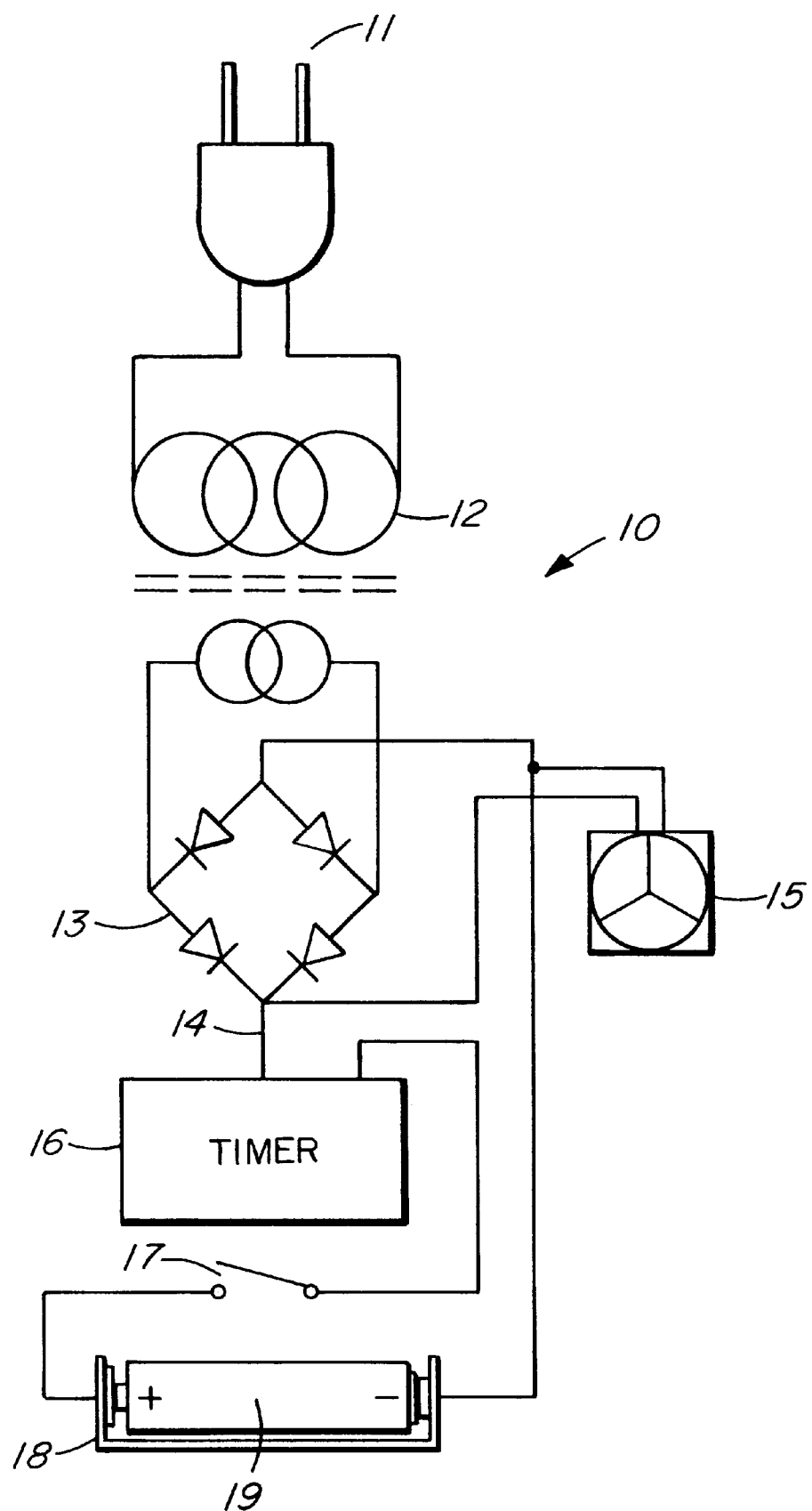

BATTERY CHARGER

BACKGROUND

1. Field of the Invention

This invention relates to an electric battery charger for conventional, non-lithium small appliance and utility, batteries.

2. Background of the Invention

Timed battery charging apparatus of various types are utilized in the prior art. Many of these, as opposed to this invention, feature a multiple level charging current system supplied continuously throughout the charging cycle to so called rechargeable batteries. Generally these apparatus exhibit complex circuitry that are relatively costly to manufacture. It can therefore be appreciated that there continues to be a need for timed battery charging apparatus with simplicity of design and economy of cost.

SUMMARY OF THE INVENTION

This invention provides a simple, inexpensive design for a timed battery charger for processing non-lithium, small appliance and utility batteries which may be of the D, C, AA and AAA type through a charging cycle, which batteries may be so called non-rechargeable type batteries.

According to the invention there is provided a timed battery charger for processing a battery through a charging cycle, comprising:

a current source having an alternating current input and a direct current output for providing current at a signal predetermined level during the charging cycle;

control means for dividing the charging cycle into a plurality of successive predetermined phases, each phase comprising a duty cycle wherein a charging current from the current is delivered to an external battery terminal, alternated with a resting cycle during which a charging current is not delivered to the external terminal of the battery.

According to the invention there may also be provided means for removably connecting the battery to the timed battery charger.

The a current source may comprises:

a transformer with a primary and secondary with the primary being connected to the alternating current input; and a bridge rectifier connected to secondary of the transformer to provide the direct current output.

The control means may comprise a timer for dividing the charging cycle into a plurality of alternating duty and resting cycles.

The invention may also include a further means for pre-determining the duration of the charging cycle with reference to the type of battery charged.

The means for pre-determining the duration of the charging cycle may be set to control the duration of the charging cycle for:

D type batteries at about 20 minutes;
C type batteries at about 15 minutes;
AA type batteries at about 10 minutes; and
AAA type batteries at about 3 minutes.

According to the invention the battery charger may further comprise a fan for the dissipation of heat generated by the battery charger during the charging cycle.

The charging current delivered to the external terminal of the battery may be between 2 and 5 ampere at about 6 volts direct current; and preferably about 4.4 ampere at about 6 volts direct current.

The duration of the duty cycle may be between 60 and 30 seconds and the duration of the resting cycle may be between 45 and 20 seconds.

The duration of the duty cycle preferably does not exceed 45 seconds and the duration of the resting cycle preferably does not exceed 20.

Perferably, the duration of the duty cycle is about 40 seconds and the duration of the resting cycle is about 20 seconds.

The above and other objects, features, and advantages of the present invention will become apparent from the following description when taken in conjunction with the accompanying drawings which illustrate preferred embodiments of the present invention by way of example.

DESCRIPTION OF THE DRAWING

The invention will be described, by way of example, with reference to the accompanying drawing, is a schematic illustrating a diagram of a timed battery charger.

DESCRIPTION OF THE PREFERRED EMBODIMENT

With reference to the drawing, numeral 10 generally indicates a timed battery charger comprising an alternating current power source 11, a transformer 12, a bridge rectifier 13, a timer 16 and a battery holder 18 permitting removably connecting a battery 19 to the timed battery charger 10.

The power source 11 is a conventional domestic alternating current power supply source of 120 v.

The battery charger 10 is used for charging the battery 19, which may be a conventional small utensil or utility battery of the "D", "C", "AA" or "AAA" type. These batteries may be of the so-called non-rechargeable alkaline battery types.

The input from the power source 11 is directed through the transformer 12 to reduce the voltage output of the power source 11 to a single pre-determined alternating current output level. The reduced alternating current output is fed through the bridge rectifier 13 to supply a single, pre-determined, direct current output 14 which is suitable to be applied to the battery 19 to be charged. This direct current output in turn, flows to the timer 16. Through timing control by the timer 16, the flow of the direct current is divided to achieve successive On/off phases of a pre-determined duration. During the On-phase, a charging current is delivered to the external terminal of the battery 19 for a pre-determined period. During the Off-phase, the flow of the charging current to the battery 19 is interrupted for a pre-determined period.

According to the preferred embodiment of the invention, the charging current 15 delivered to the external terminal of the battery 19 is about 4.4 ampere at about 6 volts direct current.

The timed battery charger 10 may include a fan 15 to dissipate the heat generated by the timed battery charger 10 during the charging cycle.

The timed battery charger 10 may further include means, such as a second timer to determine the duration of the charging cycle.

According to the preferred embodiment of the timed battery charger 10, the said second timer may be set to control the duration of the charging cycle for:

D type batteries at about 20 minutes;
C type batteries at about 15 minutes;

AA type batteries at about 10 minutes; and

AAA type batteries at about 3 minutes.

The timed battery charger 10 may also include means, such as a switch 17, to terminate the charging cycle of the timed battery charger.

Although certain preferred embodiments of the present invention have been shown and described in detail, it should be understood that various changes and modifications may be made therein without departing from the scope of the appended claims.

I claim:

1. A timed battery charger for processing a battery through a charging cycle, comprising:

a current source having an alternating current input and a direct current output for providing current at a single pre-determined level during the charging cycle;

controls means for dividing the charging cycle into a plurality of successive, predetermined phases, each phase comprising a duty cycle wherein the charging current from the current source is delivered to an external battery terminal, alternated with a resting cycle during which the charging current is not delivered to the external terminal of the battery;

further comprising a timer for determining the duration of the charging cycle;

wherein said timer is set to control the duration of the charging cycle for:

D type batteries at about 20 minutes;

C type batteries at about 15 minutes;

AA type batteries at about 10 minutes; and

AAA type batteries at about 3 minutes.

2. A timed battery charger for processing a battery through a charging cycle, comprising:

a current source having an alternating current input and a direct current output for providing current at a single pre-determined level during the charging cycle;

controls means for dividing the charging cycle into a plurality of successive, predetermined phases, each phase comprising a duty cycle wherein the charging current from the current source is delivered to an external battery terminal, alternated with a resting cycle during which the charging current is not delivered to the external terminal of the battery;

wherein the charging cycle comprises a plurality of successive resting and duty cycles wherein the duration of the duty cycle is between 60 and 30 seconds and the duration of the resting cycle is between 45 and 20 seconds.

3. A timed battery charger for processing a battery through a charging cycle, comprising:

a current source having an alternating current input and a direct current output for providing current at a single pre-determined level during the charging cycle;

controls means for dividing the charging cycle into a plurality of successive, predetermined phases, each phase comprising a duty cycle wherein the charging current from the current source is delivered to an external battery terminal, alternated with a resting cycle during which the charging current is not delivered to the external terminal of the battery;

wherein the charging cycle comprises a plurality of successive resting and duty cycles wherein the duration of the duty cycle does not exceed 45 seconds and the duration of the resting cycle does not exceed 20 seconds.

4. A timed battery charger for processing a battery through a charging cycle, comprising:

a current source having an alternating current input and a direct current output for providing current at a single pre-determined level during the charging cycle;

controls means for dividing the charging cycle into a plurality of successive, predetermined phases, each phase comprising a duty cycle wherein the charging current from the current source is delivered to an external battery terminal, alternated with a resting cycle during which the charging current is not delivered to the external terminal of the battery;

wherein the charging cycle comprises a plurality of successive resting and duty cycles wherein the duration of the duty cycle is about 40 seconds and the duration of the resting cycle is about 20 seconds.

* * * * *